April 24, 1962   P. P. WUESTHOFF   3,031,566
WELDING MANIPULATOR WITH RECIPROCATING BOOM
Filed Feb. 15, 1960   3 Sheets-Sheet 1
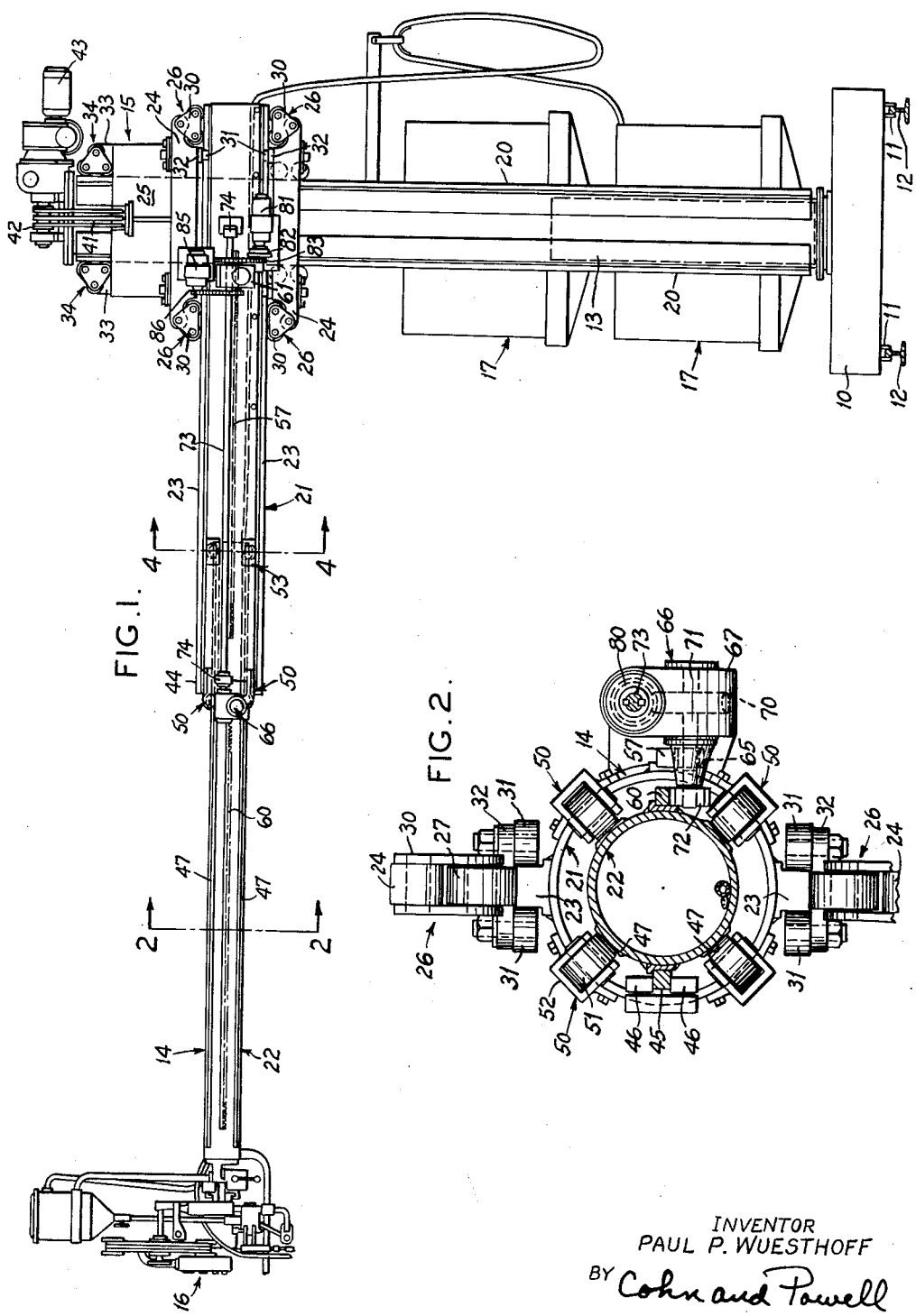
INVENTOR
PAUL P. WUESTHOFF
BY Cohn and Powell
ATTORNEYS

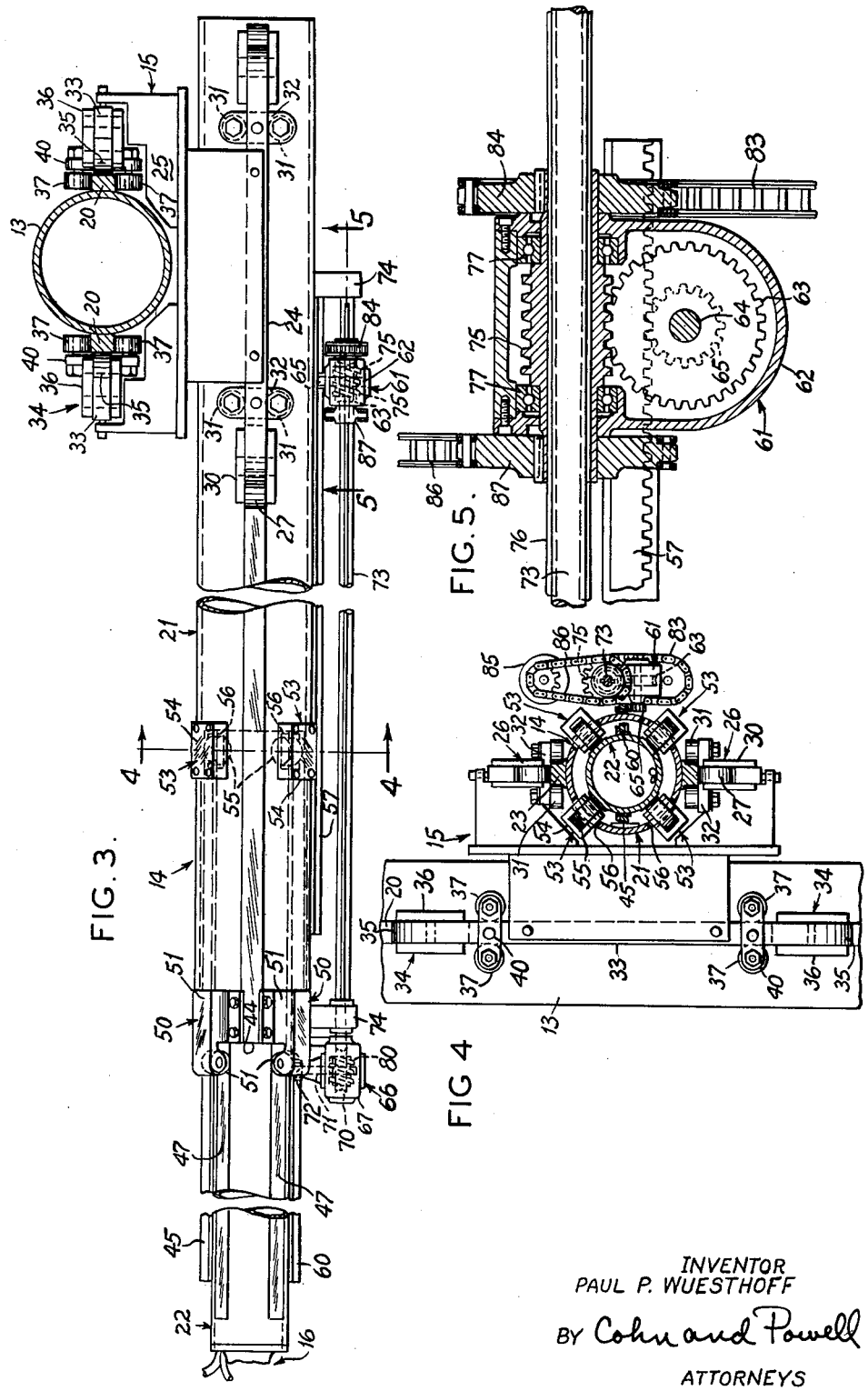

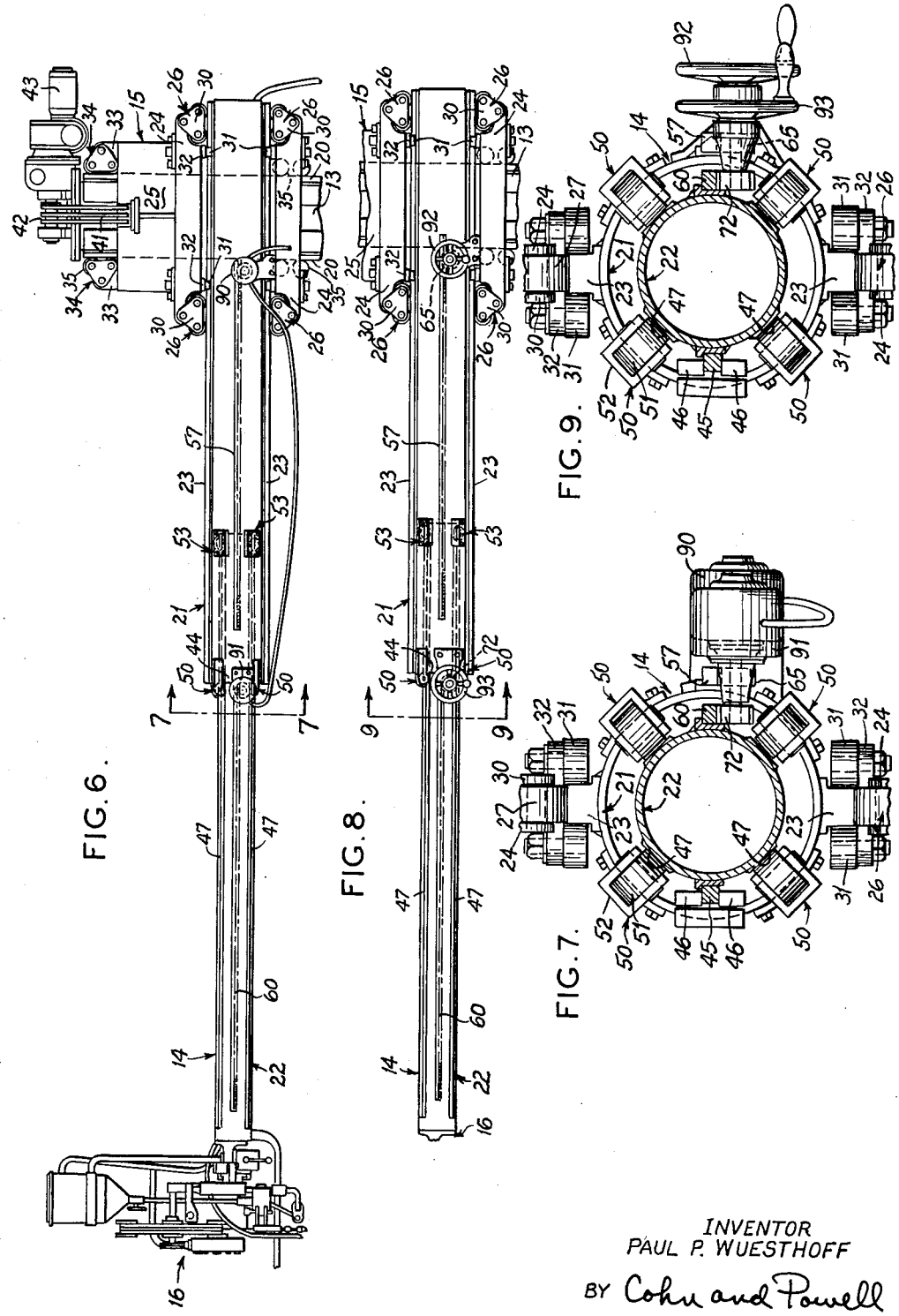

United States Patent Office 3,031,566
Patented Apr. 24, 1962

3,031,566
WELDING MANIPULATOR WITH RECIPROCATING BOOM
Paul P. Wuesthoff, St. Louis, Mo., assignor to Pandjiris Weldment Company, St. Louis, Mo., a corporation of Missouri
Filed Feb. 15, 1960, Ser. No. 8,565
18 Claims. (Cl. 219—125)

This invention relates generally to improvements in a welding manipulator with a reciprocating boom, and more particularly to improvements in the structure of the boom and in the means for selectively extending and telescoping such boom.

In the manipulators of heretofore conventional designs which have a welding head carried on one end of a unitary boom, considerable space must be provided at the point of installation to accommodate the opposite end of the boom as the welding head is moved inwardly toward the supporting standard upon longitudinal movement of the boom in one direction. This space extends rearwardly of the manipulator substantially the length of the boom, extends vertically substantially the height of the standard because the boom is carried by a crosshead that is reciprocally mounted on the standard, and extends for a distance lengthwise dependent on the distance the standard is movable along a track. Because all portions of this space must be available to the boom during operation of the manipulator, such space cannot be utilized for other purposes.

It is a major object of the present invention to provide a manipulator having a telescopic boom that considerably reduces the space requirement at the rear of the manipulator to accommodate the boom during reciprocation, thereby realizing substantial economy in plant layout and operation. A large portion of the space that would otherwise be reserved for a one piece boom at the rear of a manipulator, as previously described, can now be used for other plant operations.

An important objective is achieved by constructing the boom of a plurality of telescopically related boom members, one of which is carried and reciprocally mounted on a crosshead attached to the standard, and by the provision of operating means for reciprocating the one boom member on the crosshead and for extending and contracting the telescopically related boom members.

Another important object is realized by providing means for moving the boom members simultaneously in either direction, i.e. to a fully telescoped or fully extended position, in order to afford an even, uninterrupted movement of the welding head at the outer end of the boom so that the weld formed is continuous and of high quality. In other words, while one boom member is being telescoped within the other boom member, such other boom member is being retracted simultaneously on the crosshead. If the one boom member were telescoped completely before the other boom member started to retract, the inertia of such other boom member, as it is overcome by the drive force, causes a vibration or jerk of the welding head which results in a break or interruption in the weld. This disadvantage is avoided by the present boom structure and operating means.

Still another important object is achieved by the particular structure of the drive-operating means for the boom members in providing the previously discussed functional results. In the preferred embodiment, each boom member is provided with a rack, and the assembly includes a first pinion carried by the crosshead which meshes with the rack of the first boom member mounted on the crosshead, a second pinion carried by the first boom member which meshes with the rack of the second boom member, and a shaft rotatively mounted and carried by the first boom member which operatively interconnects and rotates the pinions to move the boom members simultaneously upon rotation of the shaft.

Yet another important object is obtained by the provision of a pair of drive gears attached to the shaft for rotation therewith, each drive gear acting through a speed reducer to rotate one of the pinions. In this structure, the one drive gear that operates to rotate the pinion carried by the crosshead is slidably mounted on the shaft for longiudinal movement so as to maintain operative drive connection with the speed reducer carried also by the crosshead and yet enable reciprocation of the shaft as the boom member is reciprocated in the crosshead.

Another important object is afforded in that synchronous motors can be utilized for driving the pinions in lieu of the aforementioned speed reducers and crossshaft structure which provide simultaneous telescoping and reciprocating action of the boom members with all of the resultant functional advantages.

Another important objective is achieved by the provision of roller units carried on the first boom member and operatively engaging tracks on the second boom member so as to mount the boom members for relative telescopic action. The roller units are structurally located and attached so that replacement of rollers can be readily accomplished when desired.

Other important advantages are realized by the provision of two motors operatively connected to the cross shaft for moving the boom members in either direction, i.e. to a fully telescoped or fully extended position, one of the motors being adapted to rotate the shaft at a relatively slower speed than the other motor and connected to the shaft by a clutch that is opened automatically to disengage the slower speed motor upon actuation of the higher speed motor as a precautionary measure.

An important object is to provide a welding manipulator having a telescopic boom which is simple and durable in construction, economical to manufacture, efficient in operation, and which can be operated by any one with only a minimum of instruction.

The foregoing and numerous other objects and advantages of the invention will more clearly appear from the following detailed description of a preferred embodiment, and of modifications thereof, particularly when considered in connection with the accompanying drawings, in which:

FIG. 1 is a front elevational view of a welding manipulator utilizing the improved telescoping boom;

FIG. 2 is an enlarged cross-sectional view of the telescoping boom as seen along line 2—2 of FIG. 1;

FIG. 3 is an enlarged top plan view, partially in cross-section and broken away, of the telescoping boom;

FIG. 4 is a view partially in cross-section, as seen along line 4—4 of FIGS. 1 and 3;

FIG. 5 is an enlarged cross-sectional view of the drive assembly with the cross shaft as seen along line 5—5 of FIG. 3;

FIG. 6 is a fragmentary front elevational view of the telescoping boom illustrating a modified embodiment of the operating means;

FIG. 7 is an enlarged cross-sectional view of the boom as seen along line 7—7 of FIG. 6;

FIG. 8 is a fragmentary front elevational view of the telescoping boom illustrating another embodiment of the operating means, and FIG. 9 is an enlarged cross-sectional view as seen along line 9—9 of FIG. 8.

Referring now by characters of reference to the drawings, and first to FIG. 1, it is seen that the manipulator is particularly adapted to position and move a welding unit.

Briefly, the manipulator includes a base 10 on which are mounted a plurality of wheels 11 adapted to engage rails 12 mounted on the subjacent floor. Attached to base 10 and extending vertically upward is a column or standard 13 having a substantially circular configuration in cross section as shown more clearly in FIG. 3. A horizontal boom indicated at 14 is adjustably related and mounted on standard 13 by a crosshead assembly indicated at 15. A detailed description of the boom 14 together with its functional advantages will be presented subsequently.

As stated previously, the manipulator in which the telescopic boom 14 is disclosed is equipped with welding apparatus. For example, a welding head and control mechanism generally indicated at 16 is carried at one end of horizontal boom 14. In some cases, a chair is provided for the seating of an operator at the end of boom 14. Other cooperating welding equipment, such as flux hoppers and electrical control mechanism referred to generally at 17, is mounted on the base 10 and standard 13.

Provided on opposite sides of standard 13 is a pair of vertical, longitudinally extending tracks 20, as is best shown in FIGS. 1 and 3. The tracks 20 are of substantially U-shape having opposed side walls and webs preferably related at right angles.

The boom 14 is constructed of a pair of telescopically related boom members 21 and 22, the first boom member 21 being reciprocally mounted on crosshead 15 while the second, smaller boom member 22 is reciprocally mounted within the coacting first boom member 21. A pair of longitudinally extending tracks 23 is disposed on opposite sides of first boom member 21. As best shown in FIG. 2, the tracks 23 are of U-shape having opposed side walls and web disposed in right angular relation.

The crosshead assembly 15 utilized in this manipulator is of the type fully disclosed and claimed by U.S. Patent No. 2,909,394, issued October 20, 1959, and entitled "Crosshead Assembly."

Briefly, the crosshead assembly 15 includes a pair of boom bars 24 constituting brackets located on opposite sides of the first boom member 21, the boom bars 24 extending longitudinally along the first boom member 21 and extending across the vertical standard 13. The boom bars 24 are secured to body member 25 of crosshead assembly 15.

Mounted on each end of each boom bar 24 is a roller set 26. As is best seen in FIGS. 2 and 3, each roller set 26 includes a pair of web rollers 27 carried by a yoke 30 pivotally mounted to the boom bars 24, the web rollers 27 being adapted to engage the web of track 23. Further, each roller set 26 includes a pair of side rollers 31 rotatively mounted on a cross rod 32 pivotally attached to the boom bar 24. The side rollers 31 are adapted to engage the opposed side walls of boom track 23 disposed therebetween.

To compensate for wear either in the side walls of track 23 or in the side rollers 31, the cross rod 32 can be swingingly adjusted about its pivot axis to regulate the pressure contact of side rollers 31 with the track side walls, and then retained in adjusted position.

Means can be included in this crosshead assembly for selectively adjusting the position of the boom bars 24 as is taught in the aforementioned U.S. Patent No. 2,909,394.

A similar structural arrangement operatively interconnects the body member 25 of crosshead assembly 15 with the vertical standard 13. For example, a pair of standard bars 33 constituting brackets is located on opposite sides of standard 13, the standard bars 33 extending longitudinally along the opposed standard tracks 20 and extending across the first boom member 21. The standard bars 33 are secured to the crosshead body member 25.

A roller set indicated at 34 similar to roller set 26 is mounted at each end of each standard bar 33. As is best seen in FIG. 3, each roller set 34 includes a pair of web rollers 35 carried by a yoke 36 pivotally mounted on standard bar 24, the web rollers 35 being adapted to engage the web of track 20. In addition, each roller set 34 includes a pair of side rollers 37 rotatively mounted on opposite sides of a cross rod 40 that is pivotally mounted to standard bar 33. The side rollers 37 are adapted to engage the opposed side walls of standard track 20.

In order to compensate for wear either in the side walls of track 20 or in side rollers 37, the cross rod 40 is swingingly adjusted to regulate the pressure contact of side rollers 37. After adjustment, the cross rod is fixed in place on the standard bar 33 and the side rollers 37 are hence retained in adjusted position.

Again, it will be noted that adjustment means may be included in this crosshead assembly 15 for regulating the position of the standard bars 33, as is taught in Patent No. 2,909,394.

A chain 41 is attached to the body member 25 of crosshead assembly 15, the chain 41 extending upwardly along standard 13 and over sprockets 42. The chain 41 is operatively connected to a power mechanism indicated at 43 and is adapted to raise and lower the crosshead assembly 15 on standard 13, and hence position the boom 14 in the desired horizontal plane.

As explained previously, the second boom member 22 is mounted within the first boom member 21 and adapted to extend and retract through one end 44 of boom member 21. From FIG. 2 it is seen that a guide rib 45 is attached to and extends longitudinally along one side of boom member 22. The coacting first boom member 21 is provided with a pair of spaced plates 46 constituting guideways adapted to receive the rib 45 and hence relatively position boom members 21—22.

A plurality of tracks 47, four in the embodiment disclosed, are machined on the outer surface of second boom member 22. The tracks 47 are spaced equidistantly about the periphery of second boom member 22 and extend longitudinally the length thereof. Preferably, the tracks 47 are located in relatively 90 degrees relation and are located at 45 degrees from the vertical.

Attached to the outer end 44 of first boom member 21 are a plurality of roller units indicated at 50 (four in the embodiment disclosed), each roller unit including a roller 51 rotatively mounted on a frame 52 which extends beyond the boom member end 44 to engage one of the tracks 47 formed on second boom member 22. If rollers 51 have to be replaced because of wear or for other reasons, the entire unit 50 can be readily removed by unbolting from the boom member end 44 and replaced by a new roller unit.

Another set of roller units indicated at 53 (four in the embodiment disclosed) are carried by the first boom member 21 in a region spaced inwardly from the boom member end 44. Each of the roller units 53 includes a plate 54 that is detachably connected by bolts to boom member 21, and includes a roller 55 rotatively mounted on plate 54. The roller 55 extends through an aperture 56 formed in the wall of boom member 21 to engage one of the tracks 47 formed on second boom member 22. The roller units 53 are spaced equidistantly about the periphery of boom member 21, one unit 53 for each of tracks 47.

Similarly, if replacement of any one or all of the roller units 53 is required, such unit 53 can be easily removed and a new unit inserted.

The roller units 50 and 53 support and position the second boom member 22 within the first boom member 21 for reciprocating movement into and out of boom member end 44.

An operating mechanism is employed to reciprocate the boom 14 on the crosshead 15 so as to position the welding head 16. More particularly, such operating mechanism acts to telescope the second boom member 22 within the first boom member 21 simultaneously while retracting the first boom member 21 on crosshead 15. Upon extension of boom 14 by the operating mechanism, the second boom member 22 is extended out of the end 44 of first boom member 21, while at the same time, the first boom member 21 is extended from crosshead 15.

The operating mechanism includes a rack 57 attached to and extending longitudinally along one side of first boom member 21. A similar rack 60 is attached to and extends longitudinally along the corresponding side of second boom member 22.

A speed reducer 61 is attached to and carried by the crosshead 15, the construction of speed reducer 61 being best illustrated in FIG. 5. It is seen that the speed reducer 61 includes a housing 62 in which is mounted an input gear 63 drivingly attached to stub shaft 64 for rotation therewith. A pinion 65 is attached to the outer end of stub shaft 64 for rotation therewith and is located to mesh with the rack 57 on first boom member 21.

Another speed reducer indicated at 66 is attached to and carried by the outer end 44 of first boom member 21. As is best seen in FIG. 2, the speed reducer 66 includes a housing 67 in which is located an input gear 70 drivingly attached to a stub shaft 71 for rotation therewith. Attached to the outer end of stub shaft 71 for rotation therewith is a pinion 72 that is located to mesh with the rack 60 on second boom member 22. From FIGS. 1-3 inclusive, it is seen that the speed reducer 66 including its pinion 72 extends over and beyond the outer end 44 of second boom member 21 to permit operative engagement of pinion 72 with rack 60.

Extending between and operatively interconnecting the speed reducers 61 and 66 is a cross shaft 73. A pair of spaced pillow block bearings 74 attached to the first boom member 21 rotatively support cross shaft 73. One of the pillow blocks 74 is located near the boom member end 44 closely adjacent speed reducer 66, while the other pillow block supports the end of shaft 73 extending through the speed reducer 61.

A worm gear 75 (FIG. 5) is attached to cross shaft 73 by a key 76 formed on such shaft. The worm gear 75 is rotatively mounted by and between bearings 77 within the housing 62 of speed reducer 61, and hence serves to rotatively mount the cross shaft 73 on speed reducer 61. Because of the key connection of worm gear 75, such worm gear 75 is rotatable with the cross shaft 73, and because of its meshing interconnection with input gear 63 causes rotation of pinion 65 upon turning of shaft 73.

It will be importantly noted that the cross shaft 73 moves with reciprocating boom member 21 upon extension and retraction, while the speed reducer 61 remains stationary relative to crosshead 15 because of its direct attachment with crosshead 15. The key 76 formed on cross shaft 73 extends substantially the length of shaft 73 and permits relative sliding movement of shaft 73 within worm gear 75 upon reciprocation of boom member 21. This structural arrangement maintains driving connection of worm gear 75 on shaft 73 yet enables relative sliding movement of gear 75 longitudinally along shaft 73.

Another worm gear 80 is drivingly attached to one end of cross shaft 73 by key 76 for rotation with shaft 73. The worm gear 80 meshes with the input gear 70 of speed reducer 66 and operates to rotate the pinion 72. This particular worm gear 80 is fixed on shaft 73 to preclude any longitudinal movement in contrast with the slide-mounting of worm gear 75 for the reason that speed reducer 66 is attached to boom member 21 and moves with shaft 73 upon reciprocation of such boom member 21.

An electric motor 81 (FIG. 1) is fixed to and carried by crosshead 15, the drive shaft of motor 81 being operatively connected to a sprocket and chain structure through a magnetic clutch 82. From FIG. 5 it is seen that chain 83 connected to sprocket 84 serves to rotate cross shaft 73 through the key connection of sprocket 84 with worm gear 75. Preferably, motor 81 is of slow speed and operates to reciprocate the boom 14 slowly so as to enable precise positioning of the welding head 16.

Under some circumstances it is desirable to reciprocate the boom 14 very quickly. In these instances, a relatively higher speed electric motor 85 attached to crosshead 15 is utilized. Motor 85 is connected by chain 86 to a sprocket 87 attached to worm gear 75 so as to rotate cross shaft 73. Control means (not shown) interconnects the motors 81 and 85 so that upon actuation of high speed motor 85, the magnetic clutch 82 is automatically opened to disengage motor 81, thereby safeguarding such motor 81 from rotation at high speed. On the other hand, upon actuation of motor 81 at the designed slow speed, the relatively higher speed motor 85 is not disconnected but rather is driven by its connection with shaft 73 at such slow speed. Obviously, because motor 85 is designed for high speed, rotation at the slower speed by motor 81 is harmless.

It is thought that the operation and functional advantages of the manipulator with telescoping boom 14 has become fully apparent from the foregoing detailed description of parts, but for completeness of disclosure it will be assumed that the boom 14 is fully extended as is illustrated in FIG. 1 and it is desired to move the boom 14 to a fully retracted position.

Upon actuation of either motor 81 or 85, shaft 73 is rotated to rotate worm gears 75 and 80 in an appropriate direction. Acting through speed reducers 61 and 66, the worm gears 75 and 80 act to rotate pinions 65 and 72. Because pinion 65 meshes with rack 57, the pinion 65 moves the boom member 21 rearwardly on crosshead 15. As explained previously the cross shaft 73 slides relatively within worm gear 75 upon longitudinal movement of boom member 21.

Simultaneously, pinion 72 meshes with rack 60 to move the second boom member 22 to a retracted or telescoped position within boom member 21. The length of boom members 21 and 22 and the gear ratios of the operating mechanism are selectively determined so that when boom member 21 is located in its fully retracted position on crosshead 15, the cooperating boom member 22 is fully retracted within boom member 21.

It is apparent that only a portion of boom member 21 extends rearwardly of the manipulator when the boom 14 is fully retracted instead of the combined length of both boom members if the telescopic arrangement were not utilized.

Moreover, as explained, it is important that both boom members move in the same direction simultaneously upon reciprocation of boom 14. If the boom members 21 and 22 were moved independently, after movement of the second boom member 22, the inertia of the first boom member 21 would have to be overcome to start movement. Overcoming the inertia of the boom member 21 under these conditions would cause vibration and affect the weld being formed by welding head 16. With the particular structural arrangement described, continuous smooth movement of welding head 16 is assured at all times when both boom members 21 and 22 move simultaneously as now designed.

To extend the boom 14, the cross shaft 73 is merely rotated in the opposite direction by either of motors 81 or 85. Upon rotation of the cross shaft 73, the worm gears 75 and 80 act through the speed reducers 61 and 66 respectively to cause rotation of pinions 65 and 72. Because of the intermeshing of pinions 65 and 72 with racks 57 and 60 respectively, the boom members 21 and 22 are simultaneously moved in the same direction toward an extended position. More particularly, the boom member 22 moves outwardly of boom member 21, while boom member 21 moves outwardly from crosshead 15. During extension of boom 14, the cross shaft 73 slides relative to worm gear 75 and speed reducer 61 in order to maintain the drive connection yet permit such extension.

In one modification of the operating means as disclosed in FIGS. 6 and 7, a pair of synchronous electric motors 90 and 91 is used to reciprocate boom 14. Motor 90 is attached to and carried by the end 44 of boom member 21. This motor 91 extends over the end of boom member 21 and is operatively connected to pinion 72 that meshes with rack 60 on outer boom member 22. Electrical control means operatively interconnects the synchronous motors 90 and 91 so that both operate simultaneously to rotate the pinions 65 and 72 to reciprocate the boom members 21 and 22 to either a fully extended or fully retracted position as described previously.

Under some circumstances, it may be desirable to reciprocate the boom members 21 and 22 independently. The modified structure of the operating means disclosed in FIGS. 7 and 8 affords this result. In this modified embodiment, the pinion 65 is directly connected to a shaft that is turned by a hand crank 92, the pinion 65 and crank 92 being attached to and carried directly by the crosshead 15. By manually manipulating the hand crank 92, the boom member 21 can be independently reciprocated in either direction on crosshead 15.

Similarly, the pinion 72 is directly connected by a shaft to a hand crank 93, such pinion 72 and crank 93 being attached to and carried directly by the end of boom member 21. Upon rotation of hand crank 93, the pinion 72 acting through its interconnection with rack 60 causes reciprocation of boom member 22 relative to boom member 21, either to a telescoped or extended position. It is seen that the position of the welding head 16 carried on the end of boom 14, in this embodiment, can be adjusted upon independent manipulation of either hand crank 92 or 93. Upon independent reciprocation of boom member 22, the relative position of boom member 21 with respect to crosshead 15 need not be disturbed. Similarly, upon reciprocation of boom member 21 by hand wheel 92, the position of boom members 21 and 22 relative to each other need not be disturbed.

This structural arrangement enables any combination of adjustments of boom members 21 and 22 by independent manipulation of hand cranks 92 and 93.

Although the invention has been described by making detailed reference to a preferred embodiment and several modifications thereof, such detail is to be understood in an instructive, rather than in any restrictive sense, many variants being possible within the scope of the claims hereunto appended.

I claim as my invention:

1. In a manipulator, a standard, a crosshead reciprocally mounted on said standard, a boom including telescopically related boom members, one boom member being reciprocally mounted on said crosshead, means interconnecting said one boom member with said crosshead for reciprocating said one boom member, and means interconnecting said one boom member with the next adjacent telescopically related boom member for selectively extending or retracting said one boom member relative to said crosshead and for selectively telescoping or extending said boom members.

2. In a manipulator, a standard, a crosshead reciprocally mounted on said standard, a first boom member reciprocally mounted on said crosshead, a second boom member telescopically mounted with said first boom member, operating means interconnecting said first boom member with said crosshead for reciprocating said first boom member relative to said crosshead, operating means interconnecting said first boom member with said second boom member for reciprocating said second boom member relative to said first boom member, and means interconnecting the two said operating means for moving said boom members simultaneously in the same direction to a fully retracted and telescoped position or to a fully extended position.

3. In a manipulator, a standard, a crosshead reciprocally mounted on said standard, a first boom member reciprocally mounted on said crosshead, a second boom member reciprocally mounted with said first boom member for telescopic movement, a rack attached to and extending longitudinally along each boom member, a pinion carried by said crosshead and meshing with the rack on said first boom member for reciprocating said first boom member relative to said crosshead, and another pinion carried by said first boom member and meshing with the rack on said second boom member for reciprocating said second boom member relative to said first boom member, and means for turning said pinions to move said boom members to a fully telescoped and retracted position or to a fully extended position.

4. In a manipulator, a standard, a crosshead reciprocally mounted on said standard, a first boom member reciprocally mounted on said crosshead, a second boom member reciprocally mounted within said first boom member for relative telescopic movement, a rack attached to and extending longitudinally along each boom member, a first pinion carried by said crosshead and meshing with the rack on said first boom member for reciprocating said first boom member, a second pinion carried by said first boom member and meshing with the rack on said second boom member for reciprocating said second boom member, and means interconnecting said pinions for moving said boom members simultaneously in the same direction either to a fully telescoped or fully extended position.

5. In a manipulator, a standard, a crosshead reciprocally mounted on said standard, a first boom member reciprocally mounted on said crosshead, a second boom member reciprocally mounted within said first boom member for telescopic movement, means interconnecting said first boom member with said crosshead for reciprocating said first boom member, means interconnecting said first boom member with said second boom member for reciprocating said second boom member, and a plurality of rollers carried by said first boom member and engaging said second boom member for telescopically relating said boom members.

6. In a manipulator, a standard, a crosshead reciprocally mounted on said standard, a first boom member reciprocally mounted on said crosshead, a second boom member telescopically mounted within said first boom member, means interconnecting said first boom member with said crosshead for reciprocating said first boom member, means interconnecting said first boom member with said second boom member for reciprocating said second boom member, said second boom member being provided with a plurality of longitudinally extending tracks, the first boom member being provided with apertures spaced about its periphery and spaced from its outer end, roller units disposed in said apertures and attached to said first boom member, the roller units including rollers engaging the tracks on said second boom member, and other roller units attached to the outer end of said first boom member and including rollers engaging the tracks on said second boom member, said roller units telescopically relating said boom members.

7. In a manipulator, a standard, a crosshead reciprocally mounted on said standard, a first boom member reciprocally mounted on said crosshead, a second boom member telescopically mounted within said first boom member, a rack attached to and extending longitudinally along each boom member, a pinion carried by said crosshead and meshing with the rack on said first boom member for reciprocating said first boom member, a second pinion carried by said first boom member and extending beyond the outer end of said first boom member to mesh with the rack on the second boom member for reciprocating said second boom member, said second boom member being provided with a plurality of longitudinally extending tracks, the first boom member being provided with apertures spaced about its periphery and spaced from its outer end, roller units disposed in said apertures and attached to said first boom member, the roller units including rollers engaging the tracks on said second boom member, and other roller units attached to the outer end of said first boom member and including rollers engaging the tracks on said second boom member, said roller units telescopically mounting said boom members.

8. In a manipulator, a standard, a crosshead reciprocally mounted on said standard, a first boom member reciprocally mounted on said crosshead, a second boom member telescopically mounted with said first boom member, a rack attached to and extending longitudinally along each boom member, a first pinion carried by said crosshead and meshing with the rack on said first boom member, a second pinion carried by said first boom member and meshing with the rack on said second boom member, a shaft extending between said pinions, means operatively interconnecting each of said pinions with said shaft for rotating said pinions simultaneously upon rotation of said shaft so as to move said boom members to a fully telescoped or fully extended position, and means for rotating said shaft.

9. In a manipulator, a standard, a crosshead reciprocally mounted on said standard, a first boom member reciprocally mounted on said crosshead, a second boom member telescopically mounted within said first boom member, a rack attached to and extending longitudinally along each boom member, a first pinion carried by said crosshead and meshing with the rack on said first boom member, a second pinion carried by said first boom member and meshing with the rack on said second boom member, a shaft extending between said pinions, means rotatively mounting said shaft on said first boom member, a pair of drive gears attached to said shaft for rotation therewith, means operatively connecting one drive gear with each pinion for rotating said pinions simultaneously upon rotation of said shaft, the drive gear associated operatively with said first pinion being mounted for relative sliding movement along the longitudinal axis of said shaft, and means for rotating said shaft so as to move said boom members simultaneously either to a fully telescoped or fully extended position.

10. In a manipulator, a standard, a crosshead reciprocally mounted on said standard, a first boom member reciprocally mounted on said crosshead, a second boom member telescopically mounted within said first boom member, a rack attached to and extending longitudinally along each boom member, a first pinion carried by said crosshead and meshing with the rack on said first boom member, a second pinion carried by said first boom member and meshing with the rack on said second boom member, a shaft extending between said pinions, means rotatively mounting said shaft on said first boom member, a pair of drive gears mounted on said shaft for rotation therewith, means operatively connecting one drive gear with each pinion for rotating said pinions simultaneously upon rotation of said shaft, the drive gear operatively connected to the said first pinion being mounted for relative sliding movement along the longitudinal axis of said shaft upon reciprocation of said first boom member, and power means carried by said crosshead and drivingly connected to said drive gear associated with said first pinion for rotating said shaft so as to reciprocate said boom members simultaneously either to a fully telescoped or fully extended position.

11. In a manipulator, a standard, a crosshead reciprocally mounted on said standard, a first boom member reciprocally mounted on said crosshead, a second boom member telescopically mounted with said first boom member, a rack attached to and extending longitudinally along each boom member, a first pinion carried by said crosshead and meshing with the rack on said first boom member, a second pinion carried by said first boom member and meshing with the rack on said second boom member, a shaft extending between said pinions, means rotatively mounting said shafts on said first boom member, a first worm gear keyed to the shaft for rotation therewith yet slidably mounted for relative longitudinal movement, means operatively connecting said first worm gear with said first pinion for rotating said first pinion upon rotation of said shaft, a second worm gear drivingly mounted on said shaft for rotation therewith, means operatively connecting said second worm gear with said second pinion to rotate said second pinion upon rotation of said shaft, and means connected operatively to said first worm gear for rotating said shaft so as to move said boom members simultaneously to a fully telescoped or fully extended position.

12. In a manipulator, a standard, a crosshead reciprocally mounted on said standard, a first boom member reciprocally mounted on said crosshead, a second boom member telescopically mounted within said first boom member, a rack attached to and extending longitudinally along each boom member, a first speed reducer attached to the crosshead and including a pinion meshing with the rack of said first boom member, a second speed reducer attached to the first boom member and including a pinion meshing with the rack of said second boom member, a shaft extending between said speed reducers, means rotatively mounting said shaft to said first boom member, a first drive gear attached to said shaft for rotation therewith and operatively connected to said first speed reducer, said first drive gear being slidably mounted on said shaft for relative longitudinal movement, a second drive gear attached to said shaft for rotation therewith and operatively connected to said second speed reducer, said drive gears operating through said speed reducers to rotate said pinions, and power means for rotating said shaft and hence rotating said pinions, whereby to move the boom members either to a telescoped or extended position.

13. In a manipulator, a standard, a crosshead reciprocally mounted on said standard, a first boom member reciprocally mounted on said crosshead, a second boom member telescopically mounted within said first boom member, a rack attached to and extending longitudinally along each boom member, a first speed reducer attached to the crosshead and including a pinion meshing with the rack of said first boom member, a second speed reducer attached to the first boom member and including a pinion meshing with the rack of said second boom member, a cross shaft extending between said speed reducers, means rotatively mounting said shaft to said first boom member, a first drive gear attached to said shaft for rotation therewith and operatively connected to said first speed reducer, said first drive gear being slidably mounted on said shaft for relative longitudinal movement, a second drive gear attached to said shaft for rotation therewith and operatively connected to said second speed reducer, a first motor for rotating said cross shaft, a second motor for rotating said cross shaft at a relatively slower speed than said first motor, a clutch means between the cross shaft and said second motor, and means disengaging said clutch and said second motor upon actuation of said first motor.

14. In a manipulator, a standard, a crosshead reciprocally mounted on said standard, a first boom member reciprocally mounted on said crosshead, a second boom member telescopically mounted within said first boom member, a rack attached to and extending longitudinally along each boom member, a first speed reducer attached to the crosshead and including a pinion meshing with the rack of said first boom member, a second speed reducer attached to the end of the first boom member and including a pinion disposed beyond such end of the first boom member to mesh with the rack of said second boom member, a cross shaft extending between said speed reducers, means rotatively mounting said shaft to said first boom member, a first worm gear keyed to said cross shaft for rotation therewith and operatively connected to said first speed reducer so as to rotate said first pinion, said first worm gear being slidably mounted on said cross shaft for relatively longitudinal movement, a second worm gear attached to said shaft for rotation therewith and operatively connected to said second speed reducer so as to rotatae said second pinion, and power means operatively connected to said first worm gear for rotating said shaft and hence rotating said pinions, whereby to move the boom members either to a telescoped or extended position.

15. The combination and arrangement of elements as recited above in claim 14, but further characterized in that said power means is comprised of a first motor, a drive means connecting said first motor to said first worm gear to rotate said cross shaft, a second motor, another drive means connecting said second motor to said first worm gear to rotate said cross shaft at a relatively slower speed than said first motor, a clutch means between the cross shaft and the said second motor, and means interconnecting said first motor to said clutch for disengaging said clutch and hence said second motor upon actuation of said first motor.

16. In a manipulator, a standard, a crosshead reciprocally mounted on said standard, a first boom member reciprocally mounted on said crosshead, a second boom member telescopically mounted within the first boom member, a rack attached to and extending longitudinally along each boom member, a first pinion carried by said crosshead and meshing with the rack on said first boom member, a second pinion carried by said first boom member and meshing with the rack on said second boom member, and synchronous motors one of which is operatively connected to each pinion for extending or retracting the first boom member relative to the crosshead and for telescoping or extending the second boom member relative to the first boom member.

17. The combination and arrangement of elements as recited above in claim 16, but further characterized by the provision of control means operatively interconnecting said synchronous motors for driving said pinions simultaneously at a predetermined rate so as to move the boom members simultaneously in the same direction to either a fully retracted and telescoped position or to a fully extended position.

18. In a welding manipulator, a vertical standard, a crosshead reciprocally mounted on said standard, a first boom member reciprocally mounted on said crosshead and extending horizontally from said standard, a second boom member telescopically mounted within said first boom member, a welding unit carried by the outer end of said second boom member, a rack attached to and extending longitudinally along each boom member, a first speed reducer attached to the crosshead and including a first pinion meshing with the rack of said first boom member, a second speed reducer attached to the first boom member and including a second pinion meshing with the rack of said second boom member, a cross shaft extending between said speed reducers and rotatively mounted on said first boom member, a first worm gear attached to said cross shaft for rotation therewith and operatively connected to said first speed reducer for reciprocating said first boom member upon rotation of said cross shaft, said first worm gear being slidably mounted on said cross shaft for relative longitudinal movement, means holding the first worm gear stationary relative to said crosshead, a second worm gear attached to said cross shaft for rotation therewith and operatively connected to said second speed reducer for reciprocating said second boom member upon rotation of said cross shaft, said second boom member being provided with a plurality of tracks, the first boom member being provided with apertures spaced about its periphery and spaced from its outer end, roller units disposed in said apertures and attached to said first boom member, the roller units including rollers engaging the tracks on said second boom member, other roller units attached to the outer end of said first boom member and including rollers engaging the tracks on said second boom member, and power means for rotating said shaft, whereby to move the boom members simultaneously either to a fully telescoped or extended position.

References Cited in the file of this patent

UNITED STATES PATENTS

| | | |
|---|---|---|
| 1,319,058 | Fitzpatrick | Oct. 21, 1919 |
| 1,991,128 | Tripp | Feb. 12, 1935 |
| 2,260,260 | Mikesh | Oct. 21, 1941 |
| 2,663,952 | Winget | Dec. 29, 1953 |
| 2,749,421 | Mikulak | June 5, 1956 |